United States Patent [19]

Matsumoto

[11] Patent Number: 4,683,372
[45] Date of Patent: Jul. 28, 1987

[54] IC CARD SYSTEM

[75] Inventor: Hiromichi Matsumoto, Kyoto, Japan

[73] Assignee: Omron Tateisi Electronics Co., Kyoto, Japan

[21] Appl. No.: 705,184

[22] Filed: Feb. 25, 1985

[30] Foreign Application Priority Data

Feb. 25, 1984 [JP] Japan .................. 59-33845

[51] Int. Cl.$^4$ ........................................... G06K 15/00
[52] U.S. Cl. .................................... 235/492; 235/380
[58] Field of Search ............................ 235/380, 492

[56] References Cited

U.S. PATENT DOCUMENTS

| 4,367,402 | 1/1983 | Giraud | 235/492 |
| 4,471,216 | 9/1984 | Herve | 235/492 |
| 4,498,000 | 2/1985 | Decavele | 235/492 |
| 4,523,297 | 6/1985 | Ugon | 235/492 |
| 4,532,419 | 6/1985 | Takeda | 235/492 |
| 4,550,248 | 10/1985 | Hoppe | 235/492 |

Primary Examiner—Harold I. Pitts
Attorney, Agent, or Firm—Stevens, Davis, Miller & Mosher

[57] ABSTRACT

An IC card system. An accessable memory is contained therein.

2 Claims, 7 Drawing Figures

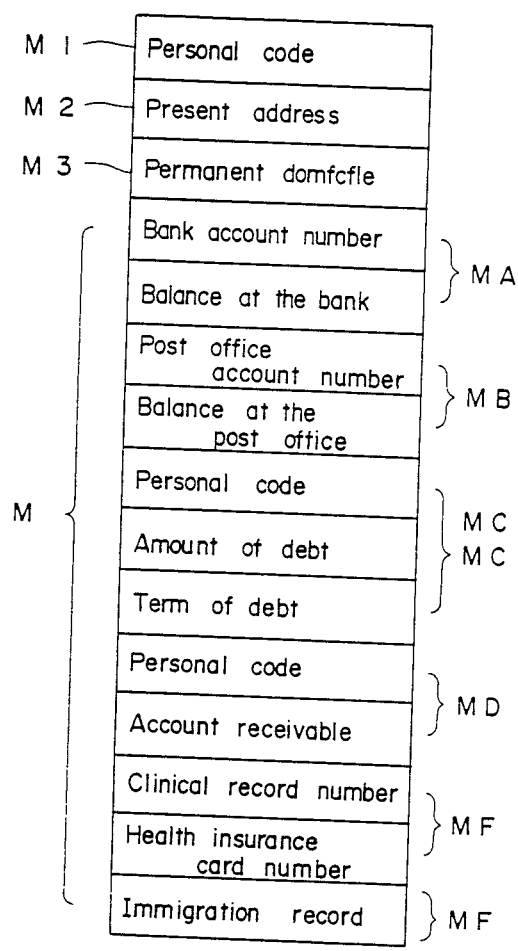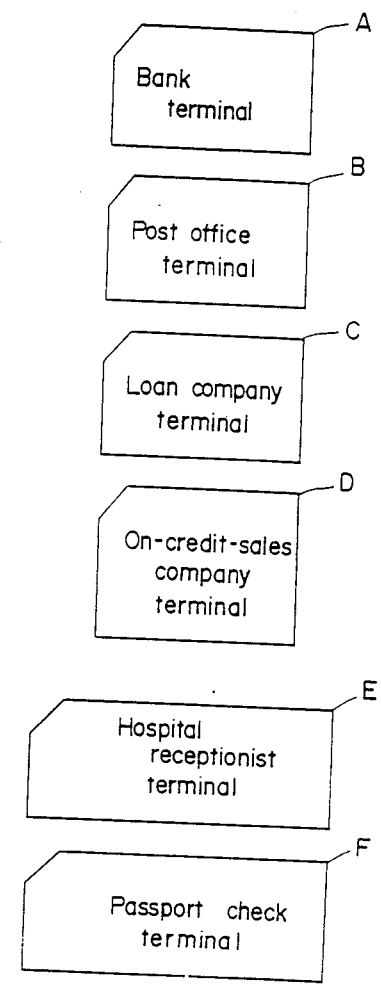

1

IC CARD SYSTEM

FIELD OF THE INVENTION

This invention relates to an IC card system comprising an IC-buried card and an IC card input means to perform data exchange therebetween.

BACKGROUND OF THE INVENTION

An IC-buried card has a data processing function and allows a wide range of applications. Due to its convenience, the IC card is assumed to replace conventional magnetic stripe cards (MS cards). With the use of an IC memory, the IC card has an improved data storage capacity. Unlike conventional MS cards, datareading, which is not passive, enhances security by eliminating access by a wrong terminal. Thus an IC card promises the use of one card for many different terminals by a holder. The current problem is, therefore, how to assure the storage of a number of different data in the card.

SUMMARY OF THE INVENTION

It is an object of the present invention to offer an IC card which has a large storage capacity thereby assuring a use of one card for various terminals and to offer an IC card system wherein reliable performance and security of the system is assured by providing the card with exclusive data storage areas for use with respective terminals.

In summary, this invention is directed to providing an IC card with areas for data storage, each of them being applicable to its own compatible terminal. When the IC card is applied, the card receives data to identify the terminal to which the card is applied. Upon receipt of the identification data, the card allows access of the terminal to the specific area of the data storage region to which the applied terminal is compatible.

In accordance with this invention, the IC card stores a number of different data therein and allows access to a compatible area by the terminal to which the card is applied. Thus, each terminal to be used has sole access to the compatible data storage area. Access by a wrong terminal to other data storage areas is thus avoided and the confidentiality of data can be maintained. Wilful editing of the stored data can be of course prevented.

BRIEF DESCRIPTION OF THE DRAWINGS

FIG. 3 shown the structure of a major part of the ROM 21 of the IC.

FIG. 4 shows types of terminals which permit the use of the IC card.

DETAILED DESCRIPTION OF THE INVENTION

Figure 1:
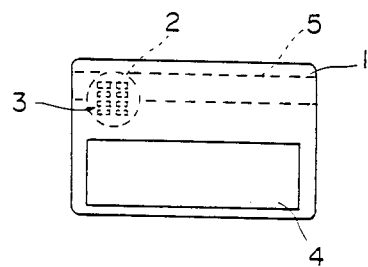
FIG. 1 is an external view of the IC card to be applied for the IC card system according to the present invention.

FIG. 1 is an external view of the IC card which is used with the IC card system in accordance with the present invention. In this figure, the IC 2 is buried inside an IC card made of plastic. On the upper surface of the IC 2, eight (8) connectors are formed and exposed to the card exterior. In addition, an embossment 4 is formed on the front surface of the card, and on the back, magnetic stripe 5 is formed to be used as a spare storage medium.

Figure 2:
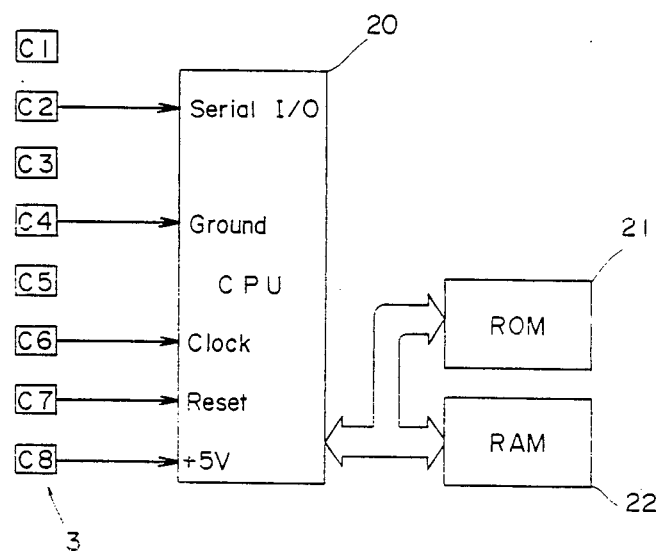
FIG. 2 is a block diagram of the IC card.

FIG. 2 is a block diagram of the IC 2. The IC 2 is composed of CPU 20, EEP ROM 21 to perform electrical writing and erasing (hereinafter abbreviated as ROM), and RAM 22 for working storage. The connector 3 is formed of conductors C1 through C8 and electric power is supplied to the CPU 20 by means of the terminals C4 and C8 when the IC card is inserted into the IC input means. A reset pulse and a clock signal are also supplied to the CPU 20 through the connector C7 and connector C6. Further, serial data exchange between the CPU 20 and the IC input means is performed through the connector C2.

FIG. 3 shown types of data to be stored in ROM 21 of the IC card. The area M1 stores a personal code of the IC card holder. The area M2 and the area M3 store the holder's present address and his/her permanent domicile. The region M constitutes data storage areas. The area MA stores a bank account number and the balance of the account and are accessible by a bank terminal. In addition, the areas MB, MC, MD, ME and MF are applicable to a post office terminal, a loan company terminal, an on-credit-sale company terminal, a hospital receptionist terminal, and a passport checking terminal respectively. The region M is divided into six data areas, each of them is exclusively accessible by respective terminals.

FIG. 4 shows the types of the terminals to which the IC card is applicable. Each terminal is provided with an IC card input means to receive the IC card to perform data exchange therebetween. It should be noted, however, that the card input means is provided with a contact unit for the contact with the connector 3 in FIG. 1. Then the data exchange is performed under the state where the contact unit is in contact with the connector 3.

The following describes the system operation in case where the IC card is applied.

Figure 5:
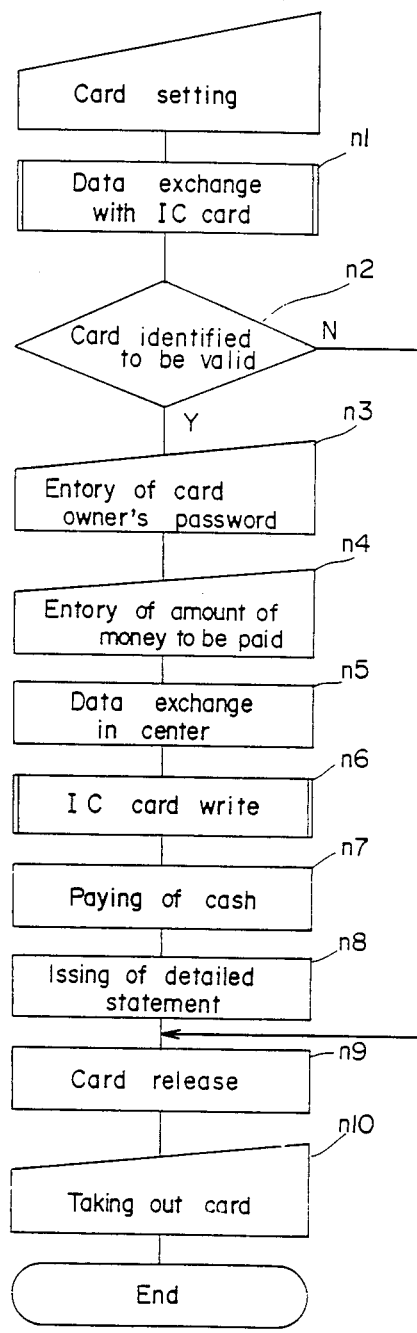
FIG. 5 is a flow chart illustrating the operation procedure when the IC card is applied.

FIG. 5 shows a flow chart of the operation of the terminal and the IC card when the card is applied to the bank terminal A. When the IC card is applied, the identification of the card is performed at the step n1 (simply n1 hereinafter). When the card is acceptable, a data transfer link is established for data exchange. The data stored in the IC card cannot be updated at this state. If the card is not acceptable, the card is rejected at step n9 and the operation is terminated upon the rejection of the card.

When the IC card is determined to be acceptable, a password is requested at step n3. When the transaction mode is a payment mode, the amount of payment is requested to be input at step n4. Then, data transmission is made between the terminal and the terminal center to check the correctness of the password or to update the date file of the terminal center. The updated data is returned to the IC card where the data is input in the memory (n6). At this time, the area MA compatible to the bank terminal A is available for access. In other words, each storage area within the MB through MF is kept unaccessible thereby assuring the exclusive access to the MA.

Upon completion of the processing at the n1, cash for the requested amount at the n4 is paid out (n7). A statement is issued (n8) and then the IC card is released (n9).

Figure 6:
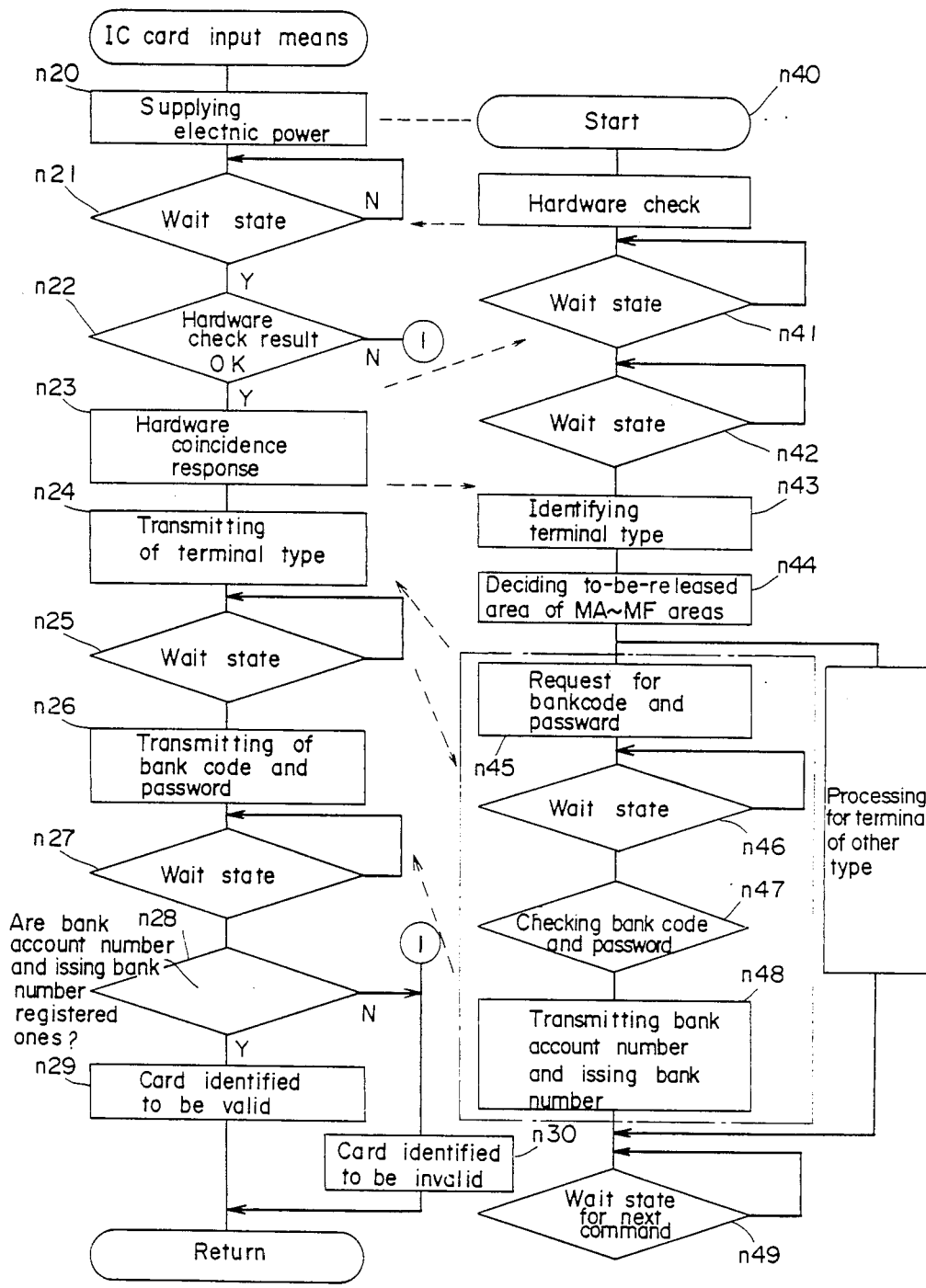
FIG. 6 and FIG. 7 are detailed flow charts of n1 and n6 respectively.

FIG. 6 shows a flow chart detailing the procedures of the n1. The left column flow chart shows the processing for the bank terminal A while the right column chart shows the processing for the IC card. With insertion of the IC card, electric power is supplied from the card input means through the connectors C4 and C8 at step n20. In addition, a reset pulse is supplied through the connector C7. The IC card operation program, prestored in the ROM 21, starts checking the correct function of hardware involved at step n40. This is a step to check the hardware thereby determining whether or not the IC card is properly applied to the card input means. Otherwise, the IC card will be rejected. For example, the rejection happens if the IC card is erroneously inserted into an MS card reader. When the card input means receives unacceptable result from the IC card, step n22 determines the card is unacceptable. A system link is established and the system elects step n23 if the check result is acceptable. Otherwise, the system elects step n30 to cause the card to be rejected and returns to the initial state. In this case, the system elects steps n2 through n9 as shown in FIG. 5 to release the card for the termination of the operation.

When the hardware checking at step n22 shows an acceptable result, a response signal is sent (n23) and terminal data is sent to the IC card (n24). Upon receipt of a hardware response signal and a subsequent terminal identification signal, the IC card evaluates identification data at step n43. The data storage area applicable thereto is then released (n44). As the terminal in use is the bank terminal A, the terminal data to be received by the IC card is the data representing the bank terminal A. The data storage region being accessible is the area MA, to which the access by the terminal is allowed exclusively.

When the area MA is accessible, request for the bank code and the password are input into the terminal at step n45. After input of these data, the terminal (IC card input means) transmits the data corresponding to the IC card (n26). The IC card checks the data received from the terminal (n47). Then the IC card sends to the terminal a bank account number stored in the area MA and the branch code number (not illustrated in FIG. 3) stored in the same area. Naturally this is the procedures where the check result is satisfactory after the identification of these numbers (n28). When they are correct in view of the registered data, card validation is performed at step n29. The IC card is then ready for the next command from the terminal (n49).

Through these operation, the steps n45 through n48 are actuated only when the terminal data sent from the terminal represents a bank terminal. If the data is not in coincidence with the designated terminal, these steps are not actuated while other steps start actuating. The data storage area then ready for access is the area which is exclusively responsive to the given terminal data.

Figure 7:
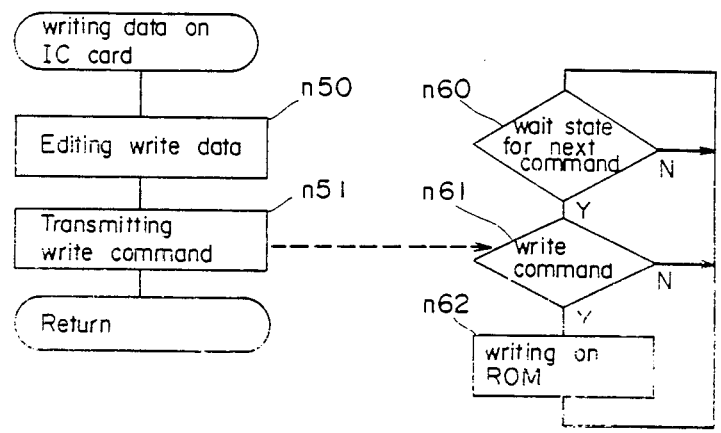

FIG. 7 shows a flow chart to indicate the procedures of operation of step n6 in FIG. 5. The data to be written in the area MA is edited at step n50 when the procedure reaches step n6. The written data is then transmitted together with a "write" command in return. Being ready for the next command, the IC card, when it receives a "write" command from the bank terminal, identifies that the received command is the exact command (n61). Following the "write" command, the transmitted data is written into the region MA. Access to the region MB throug MF is of course inhibited at this state.

As mentioned before, the IC card identifies a terminal data at step n43 and allows the access to the respective data storage area by the identified compatible terminal. Thus a single card can be used for multiple terminals while preventing access to irrelevant data storage areas which are only applicable to other terminals.

I claim:
1. An integrated circuit card system comprising:
a card comprising:
an integrated circuit supported on said card and comprising a data memory area divided into a plurality of memory regions, each of said regions corresponding to a respective type of data terminal which is capable of accessing it, and processing means for enabling a particular memory region to be accessed by a data terminal when received identification data from said data terminal indicates that said data terminal has access to said particular memory region, said processing means denying said data terminal access to other memory regions; and,
means for connecting said integrated circuit with said data terminal; and,
a data terminal comprising:
a card input means for receiving said card and transmitting data to and receiving data from said integrated circuit, and,
means for providing said terminal identification data to said integrated circuit.
2. An integrated circuit card comprising:
an integrated circuit supported on said card and comprising a data memory area divided into a plurality of memory regions, each of said regions corresponding to a respective type of data terminal which is capable of accessing it and processing means for enabling a particular memory region to be accessed by a data terminal when received identification data from said data terminal indicates that said data terminal has access to said particular memory region, said processing means denying said data terminal access to other memory regions; and, means on said card for connecting said integrated circuit with said data terminal.

* * * * *